(12) United States Patent
Borgsmueller et al.

(10) Patent No.: US 7,048,189 B2
(45) Date of Patent: May 23, 2006

(54) COMMONPLACE OBJECT WITH A SURFACE THAT COMPRISES A DATA TRACK

(75) Inventors: Stefan Borgsmueller, Heidelberg (DE); Christoph Dietrich, Heidelberg (DE); Matthias Gerspach, Dossenheim (DE); Tobias Kresse, Hamburg (DE); Jörn Leiber, Hamburg (DE); Robert Thomann, Heidelberg (DE); Michael Mayer, Heidelberg (DE); Steffen Noehte, Weinheim (DE); Steffen Scheibenstock, Heidelberg (DE); Kay Schulte-Wieking, Heidelberg (DE); Stefan Stadler, Hamburg (DE)

(73) Assignee: Tesa Scribos GmbH, Heidelbert (DE)

( * ) Notice: Subject to any disclaimer, the term of this patent is extended or adjusted under 35 U.S.C. 154(b) by 0 days.

(21) Appl. No.: 10/491,383

(22) PCT Filed: Sep. 30, 2002

(86) PCT No.: PCT/EP02/10939

§ 371 (c)(1),
(2), (4) Date: Nov. 29, 2004

(87) PCT Pub. No.: WO03/031273

PCT Pub. Date: Apr. 17, 2003

(65) Prior Publication Data

US 2005/0116046 A1    Jun. 2, 2005

(30) Foreign Application Priority Data

Oct. 5, 2001   (DE) ................................ 101 49 239

(51) Int. Cl.
*G06K 19/06*   (2006.01)
(52) U.S. Cl. .................................... 235/454

(58) Field of Classification Search ................ 235/385, 235/439, 454, 462.01, 487, 491; 283/74, 283/81, 37
See application file for complete search history.

(56) References Cited

U.S. PATENT DOCUMENTS

| 3,632,995 | A |   | 1/1972 | Wilson |
|---|---|---|---|---|
| 3,645,413 | A | * | 2/1972 | Mitchell ................ 215/11.1 |
| 3,787,993 | A | * | 1/1974 | Lyon ...................... 40/306 |
| 4,658,974 | A |   | 4/1987 | Fujita et al. |
| 4,829,503 | A |   | 5/1989 | Petrov et al. |
| 4,929,818 | A | * | 5/1990 | Bradbury et al. ........ 235/381 |
| 4,990,792 | A |   | 2/1991 | Frei |
| 5,623,347 | A |   | 4/1997 | Pizzanelli |
| 6,386,458 | B1 |  | 5/2002 | Leiber et al. |

FOREIGN PATENT DOCUMENTS

| CH |       676644 A5 | 2/1991 |
|---|---|---|
| DE |    199 31 992 A1 | 8/2000 |
| WO | WO 01/37266 A1 | 5/2001 |

* cited by examiner

*Primary Examiner*—Daniel Stcyr
(74) *Attorney, Agent, or Firm*—Proskauer Rose LLP

(57) ABSTRACT

The invention relates to a commonplace object with an outer surface (4) that encircles the commonplace object (2) and with at least one cylindrical section (6) of the surface (4), in which the technical problem of specifying a commonplace object to whose surface a relatively large amount of information can be applied is solved in that the cylindrical section (4) of the surface (6) consists of a material which can be changed optically, and in that a data bit sequence is written along at least one track (8) on the cylindrical section (4).

14 Claims, 1 Drawing Sheet

COMMONPLACE OBJECT WITH A SURFACE THAT COMPRISES A DATA TRACK

BACKGROUND OF THE INVENTION

The invention relates to a commonplace object with an outer surface that encircles the commonplace object and with at least one cylindrical section of the surface, a data bit sequence being written along at least one track on the cylindrical section.

Commonplace objects of this type can be containers or packs. Containers considered are foodstuffs containers such as bottles or jars. In addition, containers can also be reagent bottles or preservation containers for blood samples. Packs considered are packs for cylindrical objects, such as consumer goods.

Many of the commonplace objects mentioned previously need codes which define the content, the intended use and/or the sales price. For this purpose, use is generally made of labels, which either bear directly legible information or information in machine-readable form such as encrypted in a bar code. In this case, the amount of information is limited by the restricted area available.

U.S. Pat. No. 3,362,995 discloses a commonplace object to which a label is stuck which has various items of optically readable information. This information also includes tracks with one or more data bit sequences. In this case, the information is printed on the material of the label, for example paper, in a conventional manner.

SUMMARY OF THE INVENTION

The invention is therefore based on the technical problem of specifying a commonplace object to whose surface a greater amount of information can be applied.

The technical problem indicated above is solved, according to the invention, in that at least the cylindrical section of the surface consists of a material which can be changed optically.

Thus, according to the invention, the surface of the commonplace object itself can be used as a data carrier. In this case, writing means any form of variation of the surface property which may be reproduced by illumination with a light beam. Here, as in the case of a write-once compact disc (CD-R), the surface can be changed by forming depressions (pits) by means of the light energy of the write beam. In addition, the reflectance of the surface can be changed, as in the case of a rewritable compact disc (CD-RW), by a change in the atomic structure of the material. In each of the two cases, the data bit sequences written can be reproduced again through the changes in the reflection properties along the track.

One advantage of the present invention is therefore that commonplace objects which have previously not been used for the storage and reproduction of digital information can themselves be used as data stores in accordance with the present invention. The data storage in this case relates mainly to the storage of data which relates to the commonplace object or its content.

A further advantage of the invention is that the optical writing and reading is carried out without contact. As a result, the operations are robust and therefore can easily be used precisely in the case of consumer goods.

Furthermore, the optical writing and reading with a focused laser beam (aperture (NA) between 0.3 and 0.6) permits a very high data density.

Finally, the cylindrical surface permits a simple type of continuous relative movement between the data track and a sensor. The latter—in a similar way to that in the case of known sensors of optical storage media—has a sensor beam which senses the information written into the data track and is reflected variably. This variable reflectance of the sensor beam then contains the binary information, which is decoded in an evaluation means connected downstream.

For the purpose of writing, the light beam from a light source, such as a laser, is focused onto the surface and binary information is written by means of different intensities of the light beam. For this purpose, techniques are preferably used which are used when writing optical storage media (CD, DVD). This applies both to the optics to be used and to the type of data bit sequence to be written. For example, in the case of compact discs (CD), it is known to write the data bit sequences in what is known as eight-fourteen modulation (EFM).

The material which can be changed optically preferably consists of a polymer film which is made from one or more of the following materials: polypropylene, polyethylene terephthalate, polyethylene naphthalate, polymethylpentene, polyimide, in conjunction with absorbers such as carbon black or various dyes, coated with the aid of suitable solvents, or embedded in polymer matrices such as PMMA. Furthermore, solvent-containing, water-soluble and light-curing varnishes are conceivable as material which can be written. Furthermore, dye polymers are conceivable. One class is the azo dyes or else the metal azo dyes, which are also used in the area of write-once CD/DVDs.

Classical photographic materials based on silver halide are also possible. Furthermore, various amorphous semiconductor compounds have been shown to be capable of being changed easily by light. Examples which may be mentioned here are sulfur arsenide (amorphous) or gallium arsenide (amorphous). The following are known from the area of rewritable CD/DVDs: Ge—Sb—Te materials, which can change between the crystalline and amorphous state.

In a further preferred manner, the track runs substantially tangentially with respect to the surface curvature of the cylindrical section. This property of the track simplifies the application of the track. This is because, by means of rotating the commonplace object about the axis of the cylindrical section with the light source stationary, the data bit sequence the data bit sequence can be written by varying the beam intensity, in particular by switching the light source on and off.

In this case, the track can extend over more than one circumference of the cylindrical section, the track being designed in the form of a helix. The continuous track then extends over more than one circumference. The helix is produced during writing by the commonplace object not only being rotated about the axis of the cylindrical section but additionally displaced along the axis. The displacement can in this case be carried out continuously in order to achieve a uniform helix form.

It is likewise possible for the track to be written as a closed track over one circumference of the cylindrical section instead of in a helix form, so that in order to produce a plurality of tracks, these are written at a distance from one another on the cylindrical surface.

There are various possibilities for writing on the surface of the cylindrical section. Firstly, the cylindrical section of the surface can be written on directly, the optical properties of the cylindrical surface being changed by means of direct irradiation of the surface.

In a further configuration of the invention, the cylindrical section of the surface consists of a coating comprising the track. If this coating is, for example, only adhesively bonded on, then the data bit track can be removed from the commonplace object and the commonplace object can possibly be provided with a track again.

The adhesive bonding or coating of the commonplace object with a photographic material as a film is certainly only a preferred embodiment of the invention, but this procedure places the lowest requirement on the commonplace object.

In a preferred embodiment of the present invention, the track with the data bit sequence has a structure which is smaller than 10 µm, preferably smaller than 5 µm and in particular smaller than 3 µm. As a result, a high data density is achieved in the track, which means that either more information overall can be stored on the cylindrical section or the cylindrical section can be reduced in size overall in order to write a comparably identical amount of data.

Furthermore, it is particularly preferable for the track to have a structure which comprises the coded information in the form of pits and lands. This structure is known from the technology of optical data carriers such as compact disc and digital versatile disk. There, either depressions (pits) and sections without depressions (lands) are produced section by section in the track, this technology being used in non-rewritable storage media.

In addition to this, it is known to represent the pits and lands of the track by means of different reflection properties of the material forming the track. Furthermore, it is known that the edges of the track are likewise used for the storage of information by means of appropriate modulation of the shape or of the surface configuration.

In a further configuration of the present invention, the data bit sequence of the track comprises information which is coded either in binary, gray-value, colored or analog form. This is intended to illustrate the fact that the type of coding in the present invention can be chosen as desired without a special type of coding being concerned.

In a further configuration of the present invention, at least two different tracks with data bit sequences at different distances from the axis of rotation of the cylindrical section are provided. In other words, at least two different tracks with different radii are written into the material of the cylindrical section. Thus, not only can the tracks be written in the axial direction beside one another as respectively closed tracks or in helix form, but it is also possible for tracks with data bit sequences to be written in each case in different cylindrical segments with different radii with respect to the axis of rotation. This also increases the data density within the cylindrical section of the commonplace object.

In this case, there is the possibility of writing the at least two tracks in the same material of the cylindrical section, therefore the same layer of the cylindrical section is used. In addition, it is also possible to write the at least two tracks in different layers of a multilayer structure of the cylindrical section. A multilayer structure of this type of the cylindrical section can be achieved by applying a plurality of layers of films. In this case, the films mentioned previously and having different properties can be used.

The principle of the exemplary embodiment indicated above, of storing information in a plurality of layers of a substrate, can be taken from DE 298 16 802. In this document, a data storage medium with a spirally wound information carrier is disclosed, on which optically readable information units can be written and can subsequently be read out again.

BRIEF DESCRIPTION OF THE DRAWINGS

In the following text, the invention will be explained in more detail using two exemplary embodiments, reference being made to the drawing, in which.

DETAILED DESCRIPTION OF THE INVENTION

Figure 1:
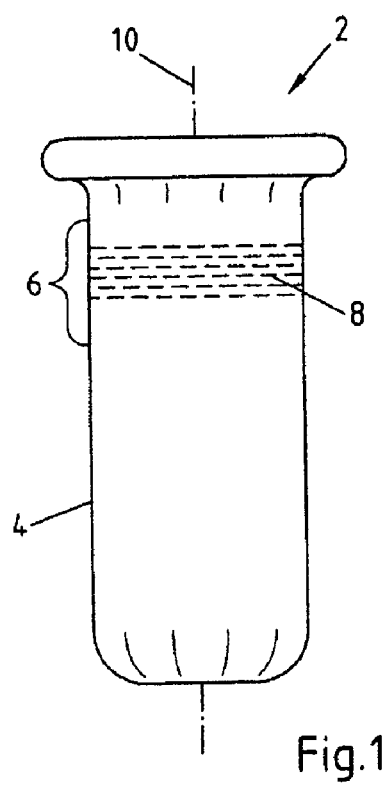
FIG. 1 shows a side view of a commonplace object in the form of a cuvette with a track written in the material of the commonplace object.
Figure 2:
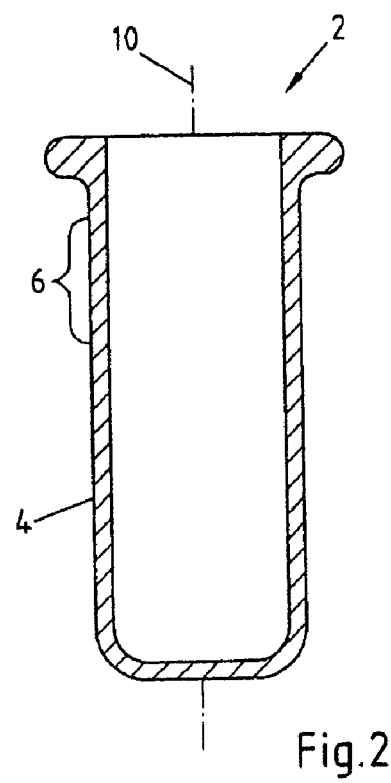
FIG. 2 shows the commonplace object illustrated in FIG. 1 in cross section.

FIGS. 1 and 2 show a first exemplary embodiment of a commonplace object 2 according to the invention. This is a cuvette, such as are used in the area of medical analysis or else generally in the area of chemical processing. These cuvettes need accurate and permanent labeling, which specifies information in particular with respect to the content. In particular in the case of medical examinations, for example in the case of blood tests, reliable information which is permanently connected with the cuvette is necessary.

Of course, the present invention is not restricted to the example described above. All the above-defined objects are suitable as commonplace objects.

The cuvette, that is to say in general the commonplace object 2 in FIGS. 1 and 2, has an outer surface 4 that encircles the commonplace object 2 and at least one cylindrical section 6 of the surface 4. According to the invention, the cylindrical section 6 of the surface 4 consists of a material which can be changed optically, a data bit sequence being written along at least one track 8 on the cylindrical section 6. The material that can be changed optically in this case consists of a polymer film, which has already been described in detail above.

As revealed in particular by FIG. 1, the tracks 8 run substantially tangentially with respect to the surface curvature of the cylindrical section 6. In other words, the tracks 8 run substantially in a plane perpendicular to the axis 10.

The restriction "substantially" refers to the fact that the tracks illustrated in FIG. 1 ultimately belong to a track 8 which runs only in the form of a helix, and which therefore have a pitch in the direction of the axis 10 of the cylindrical section 6. Because of this pitch, the track 8 does not run exactly tangentially with respect to the surface curvature.

As FIGS. 1 and 2 further illustrate, the cylindrical section 6 of the surface 4 is written on directly. This means that the binary information is written directly into the material of the commonplace object 2.

Figure 3:
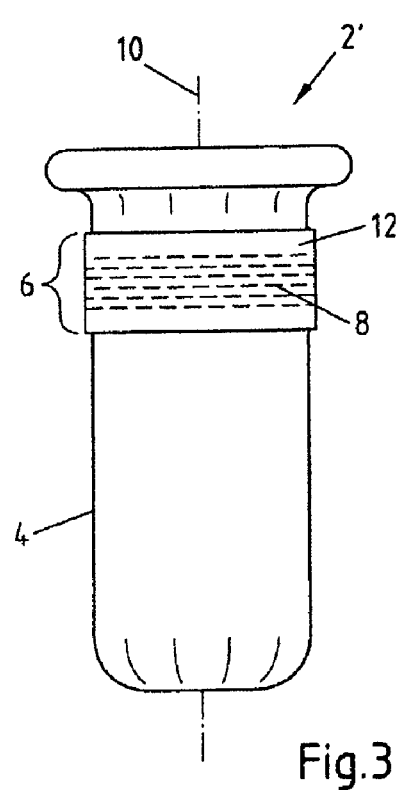
FIG. 3 shows a side view of a further commonplace object in the form of a cuvette with an applied coating bearing the track.
Figure 4:
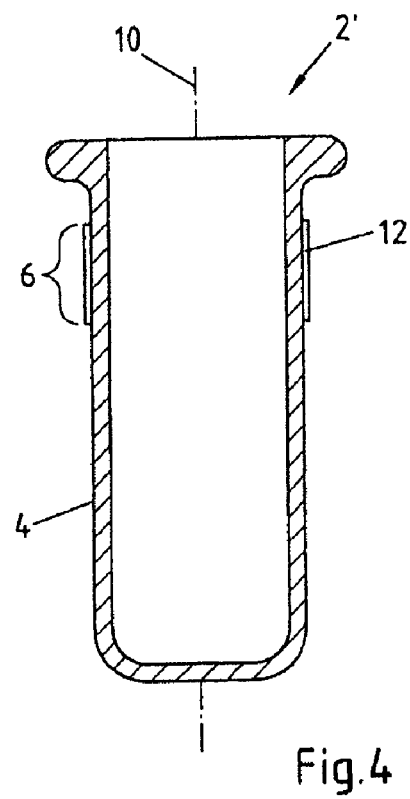
FIG. 4 shows the commonplace object illustrated in FIG. 3 in cross section.

The exemplary embodiment according to FIGS. 3 and 4 corresponds in many details to the exemplary embodiment illustrated in FIGS. 1 and 2. For this reason, identical reference symbols designate identical elements.

Differing from the first exemplary embodiment, the cylindrical section 6 of the surface 4 of the commonplace object 2' of the second exemplary embodiment is provided with a coating 12 comprising the track 8. This coating then consists of the material that can be changed optically, while the material of the commonplace object 2' does not need to have this property.

A further deviation from the first exemplary embodiment consists in the fact that the track 8 is closed over one circumference of the cylindrical section 6. Thus, the tracks 8 illustrated in FIG. 3 actually constitute different tracks 8 arranged beside one another.

The invention claimed is:

1. A commonplace object
    with an outer surface that encircles the commonplace object and
    with at least one cylindrical section of the surface,
    a data bit sequence being written along at lease one track on the cylindrical section, wherein
    at least the cylindrical section of the surface consists of a material which can be changed optically, and wherein
    the track extends over more than one circumference of the cylindrical section, and in that the track is designed in the form of a helix.

2. A commonplace object
    with an outer surface that encircles the commonplace object and
    with at least one cylindrical section of the surface,
    a data bit sequence being written along at least one track on the cylindrical section, wherein
    at least the cylindrical section of the surface consists of a material which can be changed optically, and wherein
    the track is closed over one circumference of the cylindrical section.

3. The commonplace object as claimed in claim 1 or 2, wherein the material of the cylindrical section consists of a polymer film.

4. The commonplace object as claimed in claim 1 or 2, wherein the track runs substantially tangentially with respect to the surface curvature of the cylindrical section.

5. The commonplace object as claimed in claim 1 or 2, wherein the cylindrical section of the surface is written on directly.

6. The commonplace object as claimed in claim 1 or 2, wherein the cylindrical section of the surface consists of a coating comprising the track.

7. The commonplace object as claimed in claim 1 or 2, wherein the track has a structure which is smaller than 10 µm.

8. The commonplace object as claimed in claim 1 or 2, wherein the track has a structure which comprises the coded information in the form of pits and lands.

9. The commonplace object as claimed in claim 1 or 2, wherein the data bit sequence comprises information which has a binary, gray-value, colored or analog code.

10. The commonplace object as claimed in claim 1 or 2, wherein at least two different tracks with data bit sequences at different distances from the axis of rotation of the cylindrical section are provided.

11. The commonplace object as claimed in claim 10, wherein the at least two tracks are written in a layer of the cylindrical section.

12. The commonplace object as claimed in claim 10, wherein the at least two tracks are written in different layers of a multilayer structure of the cylindrical section.

13. The commonplace object as claimed in claim 1 or 2, wherein the track has a structure which is smaller than 5 µm.

14. The commonplace object as claimed in claim 1 or 2 wherein the track has a structure which is smaller than 3 µm.

* * * * *